US012092266B2

(12) United States Patent
Shah et al.

(10) Patent No.: US 12,092,266 B2
(45) **Date of Patent: *Sep. 17, 2024**

(54) SUPPORT STRUCTURE FOR CRYOGENIC TRANSPORT TRAILER

(71) Applicant: PLUG POWER INC., Latham, NY (US)

(72) Inventors: Nidhi Shah, Latham, NY (US); Mark Ollweiler, Latham, NY (US)

(73) Assignee: PLUG POWER INC., Latham, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/336,571

(22) Filed: Jun. 16, 2023

(65) Prior Publication Data

US 2024/0125430 A1 Apr. 18, 2024

Related U.S. Application Data

(63) Continuation of application No. 17/109,115, filed on Dec. 1, 2020, now Pat. No. 11,713,848.

(60) Provisional application No. 62/942,526, filed on Dec. 2, 2019.

(51) Int. Cl.
*F17C 3/08* (2006.01)

(52) U.S. Cl.
CPC .......... *F17C 3/08* (2013.01); *F17C 2203/012* (2013.01); *F17C 2203/0391* (2013.01); *F17C 2203/0643* (2013.01); *F17C 2203/0646* (2013.01); *F17C 2223/0161* (2013.01); *F17C 2270/0171* (2013.01)

(58) Field of Classification Search
CPC ........ F17C 2203/012; F17C 2270/0171; F17C 3/08; F17C 2203/0391; F17C 2223/0161; F17C 2205/0149
See application file for complete search history.

(56) References Cited

U.S. PATENT DOCUMENTS 2,344,856 A * 3/1944 Earle .......................... F17C 1/02 29/446
2,926,810 A 3/1960 Yeager
3,119,238 A * 1/1964 Chamberlain ............ F17C 3/08 220/592.27
3,935,957 A * 2/1976 Hasegawa ............... F17C 3/022 220/1.5
4,394,929 A * 7/1983 Patel ..................... F17C 13/005 285/332
4,674,674 A 6/1987 Patterson et al.

(Continued)

*Primary Examiner* — Stephen J Castellano
(74) *Attorney, Agent, or Firm* — Heslin Rothenberg Farley & Mesiti P.C.

(57) ABSTRACT

A cryogenic dewar may include an inner tank and an outer tank. The cryogenic dewar may further include one or more longitudinal stiffeners coupled to the inner tank at locations of stress that provide resistance to such stress. The inner vessel may include a combination of longitudinal stiffeners to allow the dewar to meet governmental imposed regulations on strength and safety of the dewar without increasing the weight of the dewar or to increase the amount by weight of cryogenic liquid that can be transported under governmental imposed regulations, or both, by, with the addition of longitudinal stiffeners, simultaneously increasing the grade of the material of the inner tank.

20 Claims, 7 Drawing Sheets

(56) References Cited

U.S. PATENT DOCUMENTS

| | | | | |
|---|---|---|---|---|
| 11,713,848 | B2 * | 8/2023 | Shah | F17C 3/00 220/581 |
| 2003/0057214 | A1 | 3/2003 | Miller et al. | |
| 2015/0090727 | A1 | 4/2015 | Kataoka | |
| 2017/0254481 | A1 | 9/2017 | Cadogan et al. | |
| 2018/0066796 | A1 | 3/2018 | Heon et al. | |
| 2021/0148512 | A1 | 5/2021 | Saad et al. | |

* cited by examiner

SUPPORT STRUCTURE FOR CRYOGENIC TRANSPORT TRAILER

CROSS-REFERENCE TO RELATED PATENT APPLICATIONS

This is a Continuation patent application of U.S. patent application Ser. No. 17/109,115, filed on Dec. 1, 2020, now U.S. Pat. No. 11,713,848, and entitled "Support Structure for Cryogenic Transport Trailer," which claims the benefit of priority of U.S. Provisional Patent Application No. 62/942,526 filed on Dec. 2, 2019, and entitled "Semi-Trailer Cryogenic Tank," both of which are hereby incorporated by reference herein.

FIELD OF THE DISCLOSURE

The instant disclosure relates to the transport of cryogenic materials. More specifically, portions of this disclosure relate to trailer tank designs for the transportation of cryogenic materials.

BACKGROUND

Cryogenic liquids may have boiling points below −130 degrees Fahrenheit and may be stored at low temperatures to maintain liquid form. One example of a cryogenic liquid, liquid Oxygen, may be transported at temperatures below −300 degrees Fahrenheit, the approximate boiling point of liquid Oxygen. As another example, liquid Argon likewise has a boiling point of approximately −300 degrees Fahrenheit and may be similarly maintained at low temperatures during transport. Other examples of cryogenic liquids may include liquid Nitrogen and liquid Helium. Environmental temperatures on Earth are far greater than the boiling points of cryogenic liquids, and thus transport structures must provide sufficient isolation between a storage unit for the cryogenic liquid and the environment during transport. Failure of the isolation structure may result in significant pressure build-up in the storage unit due to gasification of the cryogenic liquid, and possibly an explosion. Strong support structures for cryogenic transport structures may reduce the possibility of a dangerous explosion. However, the cryogenic transport structures must also meet guidelines that restrict the weight of trailers towing the cryogenic transport structure due to weight limits of road structures, such as bridges.

SUMMARY

A cryogenic transport structure, such as a dewar, mounted on a trailer and towed by a tractor, may have an outer tank and an inner tank. The inner tank may include one or more stiffeners on an outside of the inner tank along a length of the inner tank. The stiffeners may provide strength and resiliency to the cryogenic transport structure to sufficiently reduce the stresses induced by weight of the cryogenic liquids during transport. The use of such stiffeners may permit the dewar to meet or exceed certain government standards for safety and strength while maintaining and/or improving the ability of the dewar to transport an amount of cryogenic liquid. The stiffeners may allow the inner tank to have increased tensile strength without having to increase the weight of the dewar by, for example, increasing the thickness of the inner tank. The stiffeners may also permit a reduction in the overall weight of the dewar by allowing a significant reduction in the thickness of the dewar inner tank relative to the amount and weight of material added by the stiffeners. The weight limit of bridges and roads includes the weight of the structure and the weight of the cryogenic liquid. Thus, reducing the weight of the structure allows larger amounts of cryogenic liquid to be transported while remaining under the bridge and road weight limits. This reduces the cost of transporting the cryogenic liquid on a per-unit basis by allowing more cryogenic liquid to be carried in a tank.

In some embodiments, the cryogenic transport structure comprises a cryogenic dewar configured for transporting cryogenic liquids across roadways, such as in Canada, with at least one longitudinal stiffener attached at a top of an inner vessel of the dewar. At least one longitudinal stiffener may additionally or alternatively be attached at a bottom of the inner vessel of the dewar, for example, at a location at an opposite end of a line drawn from the at least one longitudinal stiffener (or where it would be located) attached at the top of the inner vessel and a center of the inner vessel. In some embodiments, the at least one stiffener attached to the top and/or bottom of the inner vessel comprises three or more stiffeners. When at least one longitudinal stiffener is attached at the top and bottom of the inner vessel, the longitudinal stiffeners may be attached symmetrically around the inner vessel such that each of the at least one longitudinal stiffener attached to the top is attached at a location at an opposite end of a line drawn from a corresponding longitudinal stiffener attached at the bottom and a center of the inner vessel.

The stiffener(s) may be attached to the outer surface of the inner vessel where the stresses on the inner vessel are the highest or significant. The inner vessel and/or longitudinal stiffener(s) may be made of steel, such as 304-grade stainless steel, or aluminum, such as 5083-grade aluminum, or another suitably strong material and may be thick enough such that, in combination, they adequately resist the stresses on the inner vessel during transport of cryogenic fluid in the inner vessel across roadways, for example, if the inner vessel forms part of a cryogenic dewar configured for use as part of a truck trailer. For example, in some embodiments, the inner vessel may be made primarily from aluminum and have a nominal thickness (i.e., an expressed but not necessarily exact thickness) of about 0.175 inches and/or the longitudinal stiffener(s) may be made from aluminum and have a nominal thickness of about 0.175 inches.

Such a vessel may be configured to, for example, transport about 8,200 gallons of liquid nitrogen or about 5,000 gallons of liquid argon or other amounts of cryogenic liquids. As another example, in some embodiments, the inner vessel may be made primarily from steel and have a nominal thickness of about 0.105 inches and/or the longitudinal stiffener(s) may be made from steel and have various nominal thicknesses of, for example, about 0.1054 inches, 0.165 inches, and/or about 0.135 inches.

In some embodiments, the thickest longitudinal stiffener or stiffeners is/are attached at the location(s) at the top of the inner vessel of highest stress, for example, caused by weight of transported cryogenic fluids within the inner vessel. In some embodiments, some or all of the longitudinal stiffeners, when attached to the outer surface of the inner vessel, do not have sufficient height to contact an outer vessel of a dewar of which the inner vessel is a part. In some embodiments, there is no solid physical path for heat to transfer from the inner dewar through the longitudinal stiffener(s) to an outer vessel of a dewar of which the inner vessel is a part. In some embodiments, the longitudinal stiffener(s) may be made primarily of material that is welding compatible with the material of the inner vessel. Welding compatibility refers to two materials that can be welded to join the two materials together. For example, steel is welding compatible to the inner vessel when the inner vessel is made from steel, and aluminum is welding compatible to the inner vessel when the inner vessel is made from aluminum.

In some embodiments, the inner vessel is configured to have at least one longitudinal stiffener attached to it and, when made primarily from 304-grade stainless steel, to comply with the maximum allowable tensile stress of 18,800 psi pursuant to ASME Section II, Part D, 1998 Edition, no addenda, as required by Canadian Standards Association B620 (in lieu of the 20,000 psi allowable stress under the current (as of the date of this application's filing) ASME Edition). In some embodiments, the inner vessel is configured to have at least one longitudinal stiffener attached to it and, when made primarily from 5083-grade aluminum, to comply with the maximum allowable tensile stress of 10,000 psi pursuant to ASME Section II, Part D, 1998 Edition, no addenda, as required by CSA B620 (in lieu of the 11,400 psi allowable stress under the current (as of the date of this application's filing) ASME Edition). In some embodiments, such inner vessel weighs no more than an equivalent sized inner vessel (other than material grade) configured to not include a longitudinal stiffener attached to it but that does not comply with the maximum allowable tensile stress of 18,800 psi (when made primarily from stainless steel) or the maximum allowable tensile stress of 10,000 psi (when made primarily from aluminum) pursuant to ASME Section II, Part D, 1998 Edition, no addenda, as required by CSA B620, and instead complies with only the 20,000 psi allowable stress (when made primarily from stainless steel) and the 11,400 psi allowable stress (when made primarily from aluminum) under the current (as of the date of this application's filing) ASME Edition. In some embodiments such inner vessel weighs less than an equivalent sized inner vessel (other than material grade) configured to not include a longitudinal stiffener attached to it. In some embodiments, the inner vessel configured to have at least one longitudinal stiffener attached to it has a nominal thickness at least one grade greater than the nominal thickness of the inner vessel not configured to have at least one longitudinal stiffener attached to it. In some embodiments, the inner vessel configured to have at least one longitudinal stiffener attached to it meets or exceeds governmental requirements such as, for example, the Transport Canada 341 specification standard.

As used in herein, the term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art.

The phrase "and/or" means and or. To illustrate, A, B, and/or C includes: A alone, B alone, C alone, a combination of A and B, a combination of A and C, a combination of B and C, or a combination of A, B, and C. In other words, "and/or" operates as an inclusive or.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has" or "includes" one or more elements possesses those one or more elements, but is not limited to possessing only those elements. Likewise, a method that "comprises," "has," or "includes," one or more steps possesses those one or more steps, but is not limited to possessing only those one or more steps.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings. Unless otherwise noted, the features shown in each figure are to scale relative to other features in the same figure, but not necessarily relative to features in other figures including figures showing other views.

DETAILED DESCRIPTION

Figure 1:
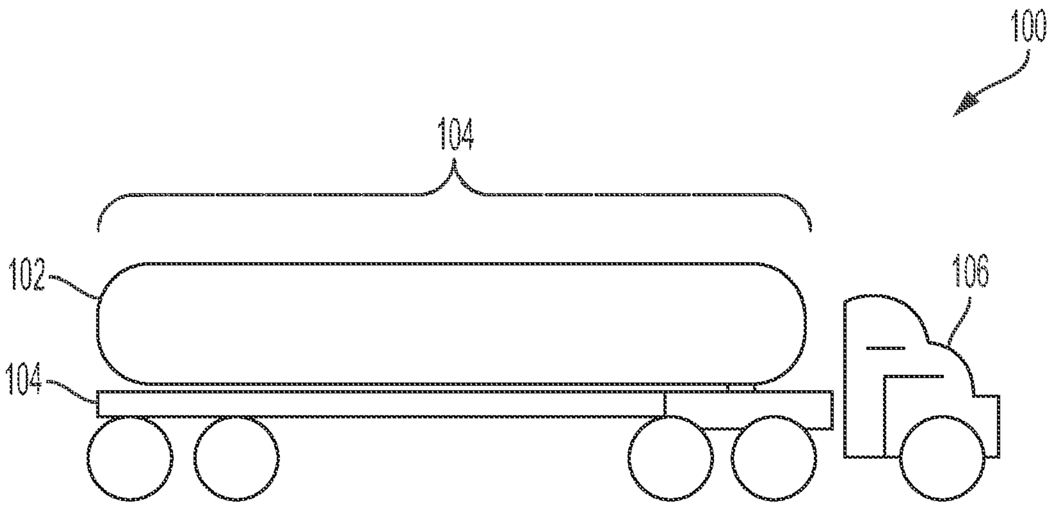
FIG. 1 is an example illustration of a truck hauling a trailer with a cryogenic dewar according to some embodiments of the disclosure.

Cryogenic dewars may be used to transport cryogenic liquids, such as oxygen, nitrogen, and argon, at low temperatures. Cryogenic dewars may include a first, inner tank, mounted inside and supported by a second, outer, tank. The use of nested tanks may insulate the cryogenic liquid to help maintain low temperatures of the liquid during transport. An example illustration 100 of a cab 106 pulling a trailer 104 holding a cryogenic dewar 102 is shown in FIG. 1. For example, trailer 104 may include a frame that supports cryogenic dewar 102 and a means for coupling the frame to the cab 106 such as a hitch or other known means. Transportation of cryogenic liquids on Canadian roadways is regulated by a variety of statutory and regulatory provisions, such as the Transportation of Dangerous Goods ("TDG") Act and the Commercial Vehicle Dimension and Weight Regulation of the Traffic Safety Act. Such provisions require that vehicles transporting cryogenic liquids on Canadian roadways comply with certain weight, size, and safety guidelines. For example, as of the filing of this application, section 5.10 of the TDG regulations specifies that transport containment of dangerous goods, such as cryogenic fluids, comply with certain Canadian Standards Association standards, such as CSA B620. Under Transport Canada 341 specification of CSA B620, the stress values of the inner vessel and inner support system of a dewar transporting cryogenic fluids shall not exceed:

(a) those calculated in accordance with UG-23 and UG-54 of the ASME Code, Section VIII, Division 1;

(b) 1.25 times the maximum allowable stress value calculated in accordance with ASME Code, Section VIII, Division 1, at a temperature of 38 degrees Centigrade for the combination of general inner vessel shell stress and the local inner vessel shell stress; and (c) the lesser of the maximum allowable stress value prescribed in ASME Code, Section VIII, Division 1 and 25% of the tensile strength of the material used.

In addition, CSA B620 requires that ASME, Section II, Part D, 1998 Edition (excluding addenda) will apply to these standards, which means a dewar transporting cryogenic fluids must also meet a safety factor of 4:1 for the above specifications-a higher standard than, as of the date of the filing of this application, the ASME safety factor of 3.5:1. Accordingly, a truck trailer designed for transportation under ASME standards may not meet the requirements to legally transport cryogenic fluids on a Canadian roadways. To meet these requirements, the thickness of the inner vessel could be significantly increased (whether the inner vessel is made from aluminum or steel) and/or stronger and heavier materials could be used to construct the inner vessel and/or inner vessel support system of the dewar (e.g., constructing an aluminum-designed dewar out of steel). However, each of these solutions would add significant weight to the dewar and therefore decrease the amount of cryogenic fluid the dewar could transport on a per-trip basis and increase the cost to transport an empty dewar, such as when refilling. One solution, as set forth in embodiments of this disclosure, is to include at least one stiffener attached to the inner tank of the dewar to strengthen it with little or no addition to its weight so that the stresses (e.g., bending and total) are below the required thresholds of the TC 341 standards. The stiffener(s) may be added to a reduced-thickness inner vessel of a dewar so that the overall weight of the inner vessel does not change or is even reduced while also increasing the stress resistance of the inner vessel by the additional stiffener(s) (i.e., the stiffener(s) more than offset the stress resistance afforded by a thicker inner vessel while adding less weight than the weight of such additional inner vessel thickness).

An example of such an inner vessel of a cryogenic dewar 1000 is shown in FIGS. 2A-2E. The inner vessel 1000 may be made from stainless steel and include a central cylindrical section 1004 having a central axis Y and coupled at its ends by two semi-spherical ends 1008, 1012. The ends 1008, 1012 may include, for example, a series of pipes 1024 for injecting and/or discharging fluids, such as cryogenic fluids, from inner vessel 1000. Inner vessel 1000 may also include multiple seams 1016 (running substantially perpendicular to axis Y), 1020 (running substantially parallel to axis Y) where, for example, plates used to form inner vessel 1000 are joined (e.g., by welding). Alternatively or additionally, inner vessel 1000 may be formed from a single integral piece of material or other methods of forming vessel may be employed.

Figure 2A:
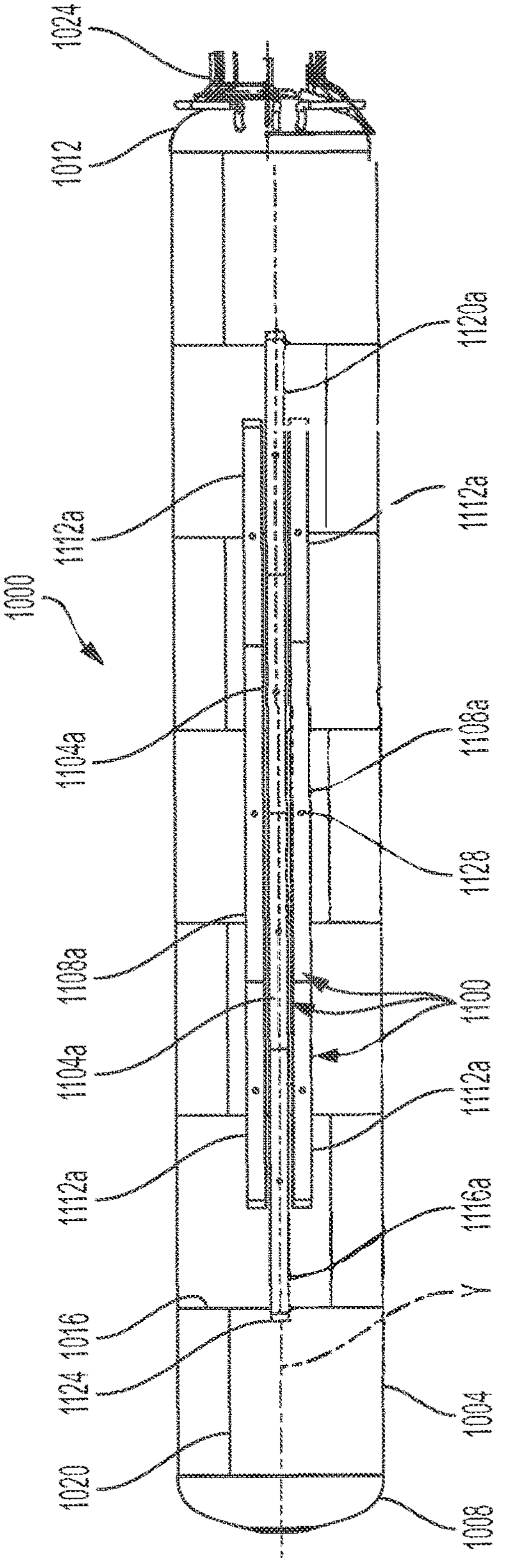
FIGS. 2A, 2B, and 2C are a top schematic view, bottom schematic view, and end schematic view, respectively, of an example inner vessel of a cryogenic dewar according to some embodiments of the disclosure.
Figure 2B:
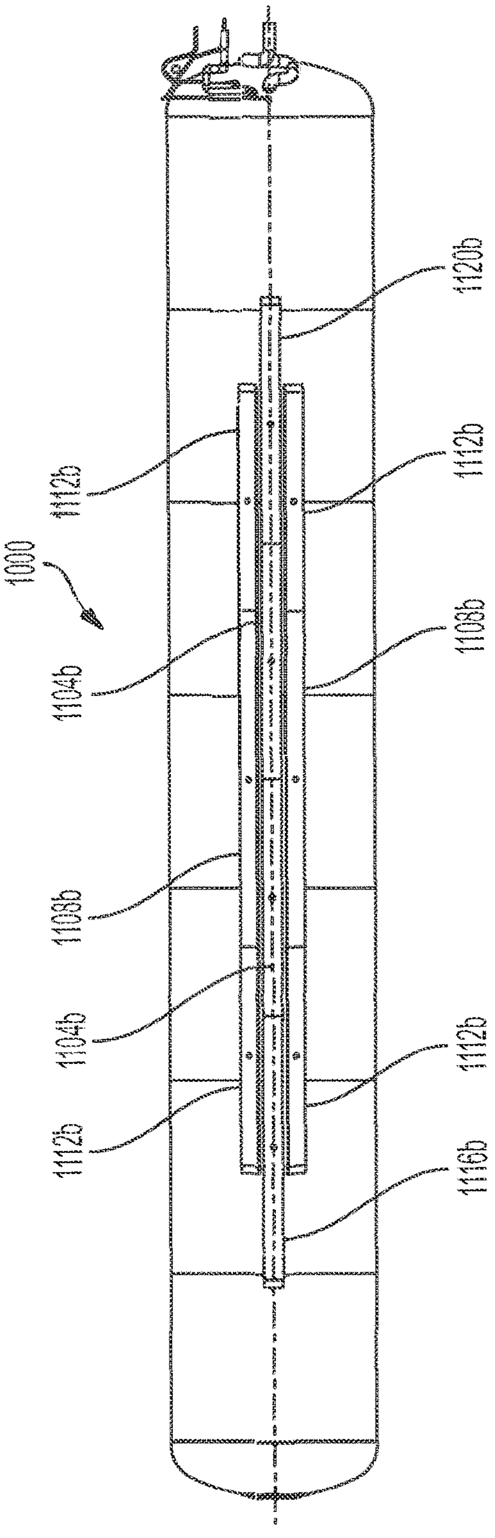
Figure 5A:
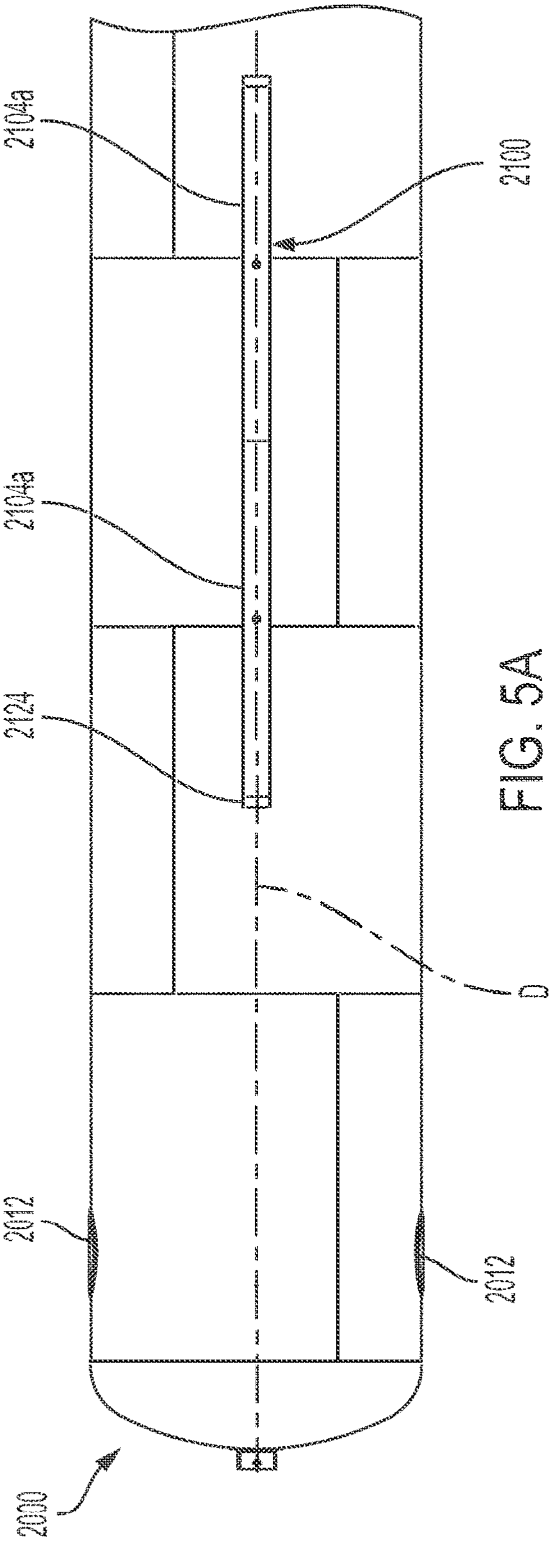
FIGS. 5A and 5B are a portion of a top schematic view and an end schematic view, respectively, of an example inner vessel of a cryogenic dewar according to some embodiments of the disclosure.
Figure 5B:
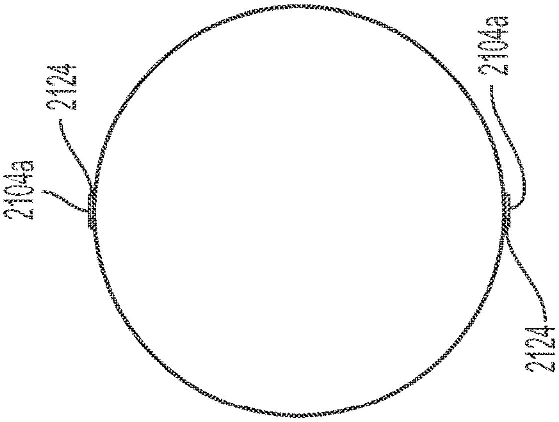

In order to strengthen inner vessel 1000 without significantly adding to its weight, a plurality of longitudinal stiffeners 1100 are positioned on the top and/or bottom outer surfaces of inner vessel 1000 and coupled thereto (e.g., by fastening through, for example, central openings 1128, and/or by welding), though they could be positioned in other locations of stress in other embodiments of an inner vessel and coupled thereto. Longitudinal stiffeners increase the section modulus of inner vessel 1000, which helps reduce stresses on inner vessel 1000. As used herein, longitudinal means extending a length of the vessel parallel to the road surface when the vessel is in transit. Exemplary longitudinal stiffeners 1100 are shown in FIGS. 3A and 3B. Longitudinal stiffeners 1100 may be made of stainless steel (e.g., 304-grade, as in the embodiment shown in FIGS. 2A-2E), or aluminum (e.g., 5083-grade, as in the embodiment shown in FIGS. 5A and 5B), or another suitably strong and stiff material, including, if coupled to inner vessel 1000 by welding, a material that is welding compatible with the material of the inner vessel. Longitudinal stiffeners 1100 may have an inner height IH, a thickness T, and an overall height H. Longitudinal stiffeners 1100 may have a constant inner height IH but be of different thicknesses T so that each has a different overall height H. In some embodiments, the height H of each stiffener 1100 may be less than the distance between the outer cylindrical surface of inner vessel 1000 and in the inner cylindrical surface of an outer vessel of a dewar so as to not provide a solid heat transfer path between the cryogenic fluid in inner vessel 1000 and the atmosphere outside the outer vessel of a dewar.

Longitudinal stiffeners 1100 may have different lengths L and be configured in multiple rows with different combinations of stiffeners 1100 (e.g., having different lengths, thicknesses, and heights) in order to optimize stress resistance relative to weight gain. For example, given that the highest tensile stresses from cryogenic fluid typically occur at the top center of inner vessel 1000 in the plane of axis Y on the side of the vessel that is furthest from the ground, two longitudinal stiffeners, such as stiffeners **1104*a*, that have relatively high thicknesses T may be positioned in this location. For example, stiffeners 1104*a* have a thickness of about 0.165 inches, which is about 157% of the nominal thickness of inner vessel 1000. The stiffeners 1104*a* are coupled (e.g., by welding or fasteners) to one another at the top center of inner vessel 1000 along the plane of axis Y and coupled on their opposite ends to other stiffeners 1116*a*, 1120*a* having relatively lower thicknesses T of about 0.1054 inches, which is about 100% of the nominal thickness of inner vessel 1000 and about 64% of the thickness of stiffeners 1104*a*. Because the stresses on inner vessel 1000 are not as high at the locations of stiffeners 1116*a*, 1120*a*, stiffeners 1116*a*, 1120*a* may have less thickness (and therefore also not weigh as much) as stiffeners 1104*a* located where the stresses are higher. Stiffeners 1116*a* and 1120*a* are configured to each have lengths L so that they span locations of high relative tensile stress as well as potential stress weakness such as along seams 1016. If these seams are located at different distances from the top center of inner vessel 1000 along the plane of axis Y, the lengths of such stiffeners may be different. For example, stiffener 1116***a* has a length of about 74.25 inches, which is about 17.5% of the total longitudinal length of inner vessel 1000, and stiffener 1120*a* has a length of about 82.25 inches, which is about 19.5% of the total longitudinal length of inner vessel 1000. Stiffeners 1104*a* similarly span seams 1016 and have sufficient lengths to span locations of high relative tensile stress; for example, stiffeners 1104*a* each have a length of about 73.375 inches, which is about 17.5% of the total longitudinal length of inner vessel 1000. Although examples are provided, the values may take other values for different designs while remaining in the scope of the disclosed configurations. For example, a nominal thickness of stiffeners may be between approximately 100-200% of the nominal inner vessel thickness, or more particularly between 100% and 160% of the nominal inner vessel thickness, and the longitudinal length of the stiffener may be approximately 10-100% of the inner vessel length, or more particularly between 12-20% of the inner vessel length.

Additional longitudinal rows of stiffeners 1100 may be positioned at other locations of high stress such as, for example, adjacent to the top center row just described. Similar to the such top center row, relatively thicker stiffeners, such as stiffeners 1108*a* (which are not as thick as stiffeners 1104*a*), may be positioned over the near-top center of inner vessel 1000 with relatively less thick stiffeners, such as stiffeners 1112*a*, coupled on either end thereto. For example, stiffeners 1108*a* have a thickness T of about 0.135 inches, which is about 129% of the nominal thickness of inner vessel 1000 and about 82% of the thickness of stiffeners 1104*a*, and stiffeners 1112*a* have a thickness T of about 0.1054 inches, which is about 100% of the nominal thickness of inner vessel 1000 and about 78% of the thickness of stiffeners 1108*a*. Stiffeners 1108*a*, 1112*a* may have lengths sufficient to span areas of high relative tensile stress as well as potential stress weakness such as seams 1016. For example, stiffeners 1108*a* have a length L of about 104.75 inches, which is about 24.6% of the total longitudinal length of inner vessel 1000, and stiffeners 1112*a* each have a length of about 68 inches, which is about 16% of the total longitudinal length of inner vessel 1000.

Figure 4C:
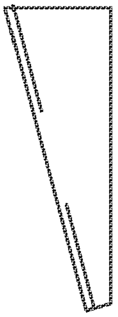
FIGS. 4A, 4B, and 4C are a top schematic view, end schematic view, and side schematic view, respectively, of an example longitudinal stiffener cap according to some embodiments of the disclosure.
Figure 4B:
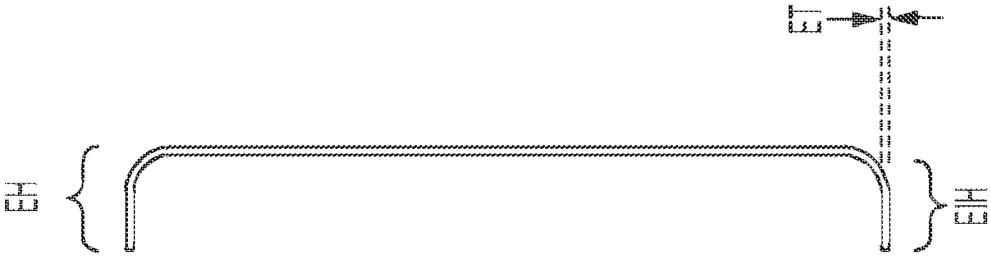
Figure 4A:
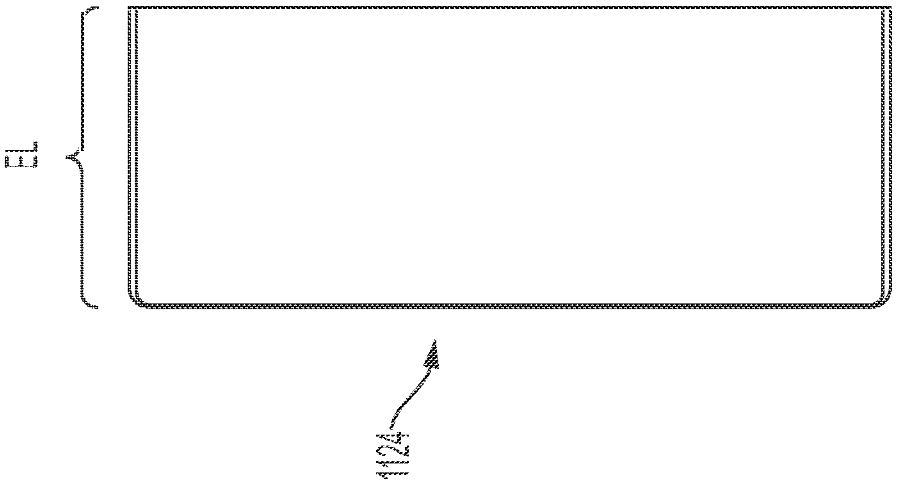

Caps 1124 are coupled (e.g., by welding or fasteners) at the end of each open end of the longitudinal rows (e.g., on an end of each of stiffeners 1112*a*, 1116*a*, and 1120*a*). Caps 1124 may be made of stainless steel (e.g., 304-grade, as in the embodiment shown in FIGS. 2A-2E), or aluminum (e.g., 5083-grade, as in the embodiment shown in FIGS. 5A and 5B), or another suitably strong and stiff material, including, if coupled to inner vessel 1000 by welding, a material that is welding compatible with the material of the inner vessel. An exemplary cap 1124 is shown in FIGS. 4A-4C having a length EL, inner height EIH, thickness ET, and overall height EH. Caps 1124 prevent debris and other material from entering the space between the stiffeners 1100 and the outer surface of inner vessel 1000, as shown more clearly in FIGS. 2C-2E.

Figure 2C:
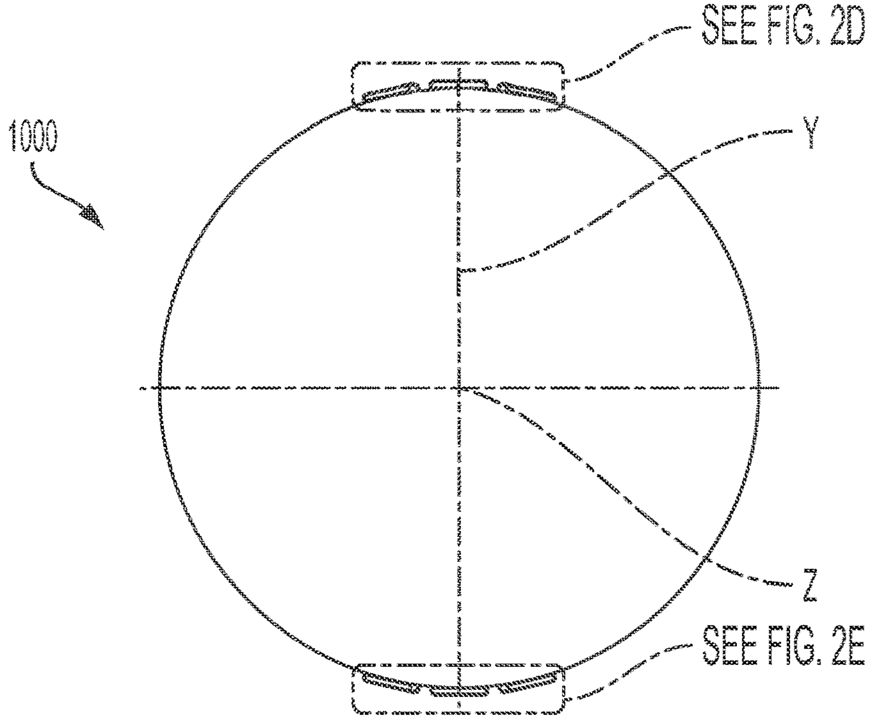
Figure 2D:
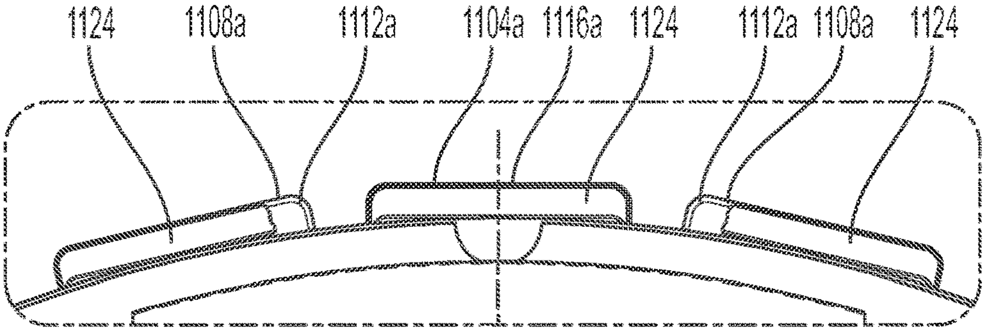
FIGS. 2D and 2E are enlarged views of portions of FIG. 2C.
Figure 3A:
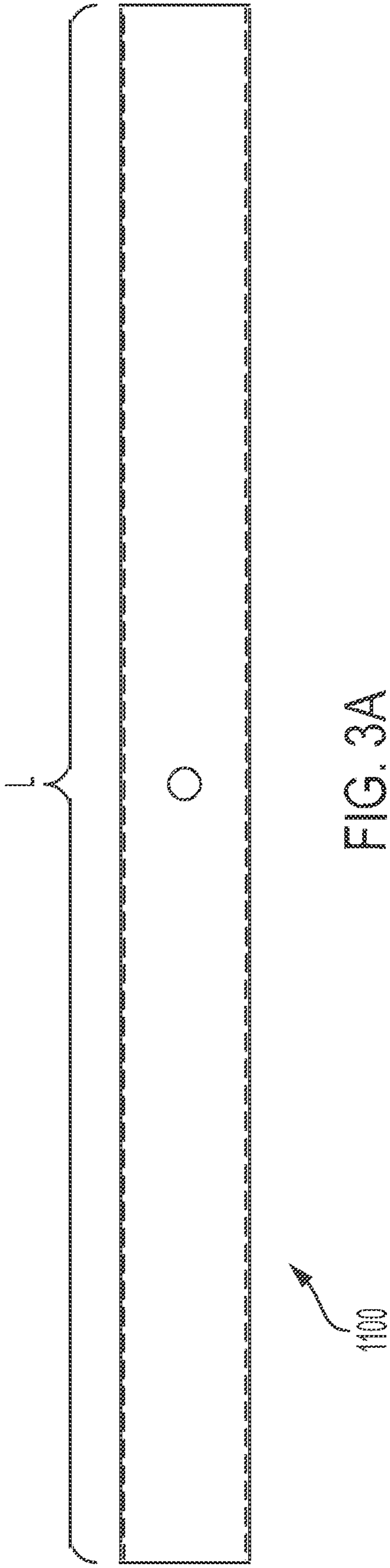
FIGS. 3A and 3B are a top schematic view and end schematic view, respectively, of an example longitudinal stiffener according to some embodiments of the disclosure.
Figure 3B:
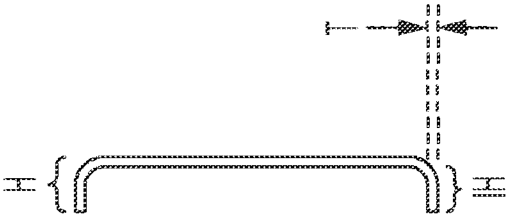

Referring now to FIG. 2D, which is an enlarged view of FIG. 2C, the various heights of the stiffeners 1100 and caps 1124 at the ends of each of the top longitudinal rows of stiffeners 1100 are shown (partially cut away in the off-center rows). As depicted, stiffeners 1108*a* have a greater overall height H than stiffeners 1112*a*, stiffeners 1104*a* have a greater overall height H than stiffener 1116*a*, and all stiffeners 1100 have a greater overall height H than the overall height EH of caps 1124.

Figure 2E:
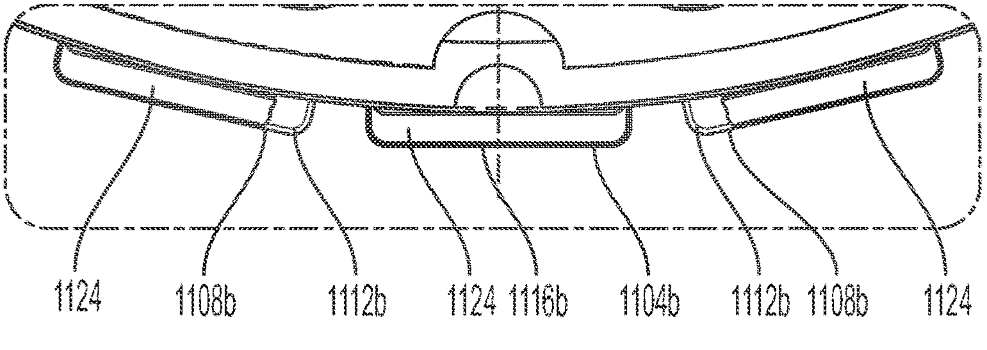

The bottom of inner vessel 1000 may experience significant stress similar to the stress experienced at the top of inner vessel 1000. Accordingly, to sufficiently resist such stress, a combination of stiffeners 1100 arranged substantially the same as the combination of stiffeners 1100 at the top of inner vessel 1000 (as shown in FIGS. 2A and 2D), may be positioned on the outer surface of the bottom of inner vessel 1000. One example arrangement is shown in FIGS. 2B and 2E. Such bottom stiffeners 1100 may be substantially the same as top stiffeners 1100 and are accordingly referred to by the same reference numerals as stiffeners 1100 shown in FIGS. 2A and 2D, except that such reference numerals end with a "b" instead of an "a" (e.g., top stiffener 1104*a* corresponds to and is substantially identical to bottom stiffener 1104*b*). As shown in FIG. 2C, the bottom stiffeners may be positioned at opposite locations on inner vessel 1000 from the top stiffeners along a line drawn from the top stiffeners through the center Z of inner vessel 1000.

The configuration of stiffeners 1100 in FIGS. 2A-2E is just one exemplary embodiment and other configurations are contemplated herein so long as they allow for increased stress resistance of an inner vessel. Another example configuration is shown with reference to FIGS. 5A-5B. An inner vessel 2000 is depicted that is substantially the same as inner vessel 1000 except as otherwise stated herein. Inner vessel 2000 is made from 5083-grade aluminum, includes trunnion mounts 2012 (as shown, which may alternatively or additionally be at other locations such as an opposite end of inner vessel 2000 along axis D), and has a plurality of longitudinal stiffeners 2100. Stiffeners 2100 are substantially the same as stiffeners 1100, having a length L, inner height IH, thickness T, and overall height H that are sufficient to resist the stresses on inner vessel 2000 and not contact the outer vessel of a dewar when coupled (e.g., by fastening or welding) to inner vessel 2000. In this embodiment, a single longitudinal row of two longitudinal stiffeners 2104*a* is positioned at the top center of inner vessel 2000 in the plane of central axis D (i.e., typically the location of greatest stress) and coupled together and to vessel 2000 (e.g., by fastening or welding). Stiffeners 2104*a* have a relatively large thickness of about 0.175 inches, which is about 100% of the nominal thickness of inner vessel 2000, and are long enough (i.e., about 80 inches each, which is about 19% of the total longitudinal length of inner vessel 2000) to provide sufficient stiffness to inner vessel 2000 to sufficiently resist tensile stresses created by re gasification of cryogenic fluids within inner vessel 2000 during transport. A cap 2124, which is substantially the same as cap 1124, is positioned over the open ends of the row of stiffeners 2104*a* and coupled thereto and/or to inner vessel 2000 at that location (e.g., by fasteners or welding). Similar to the embodiment shown in FIGS. 2A-2E, the embodiment shown in FIGS. 5A-5B also includes a corresponding row of longitudinal stiffeners 2104*b* and caps 2124 positioned at the bottom center of inner vessel 2000 in the plane of central axis D, as partially shown in FIG. 2B, and configured and coupled in substantially the same manner.

Configurations of longitudinal stiffeners 1100, such as those shown in FIGS. 2A-2E and 5A-5B, permit an inner vessel of a dewar such as inner vessel 1000, that may be designed to meet lower stress requirements without the addition of longitudinal stiffeners 1100, to meet higher stress requirements, such as those set forth in the TC 341 standard. It also permits such increased strength without having to create a new inner vessel with, for example, a greater thickness or made from a heavier material, thereby lowering manufacturing costs. Also, the addition of longitudinal stiffeners in configurations like those described herein may permit reduction in thickness and/or weight of material of a dewar inner vessel while maintaining sufficient (including legally sufficient) ability of the inner vessel to resist stresses therein. The weight of the inner vessel and therefore the weight of the dewar may also be reduced thereby to permit transport of greater loads of cryogenic fluid legally across roadways, thereby lowering transportation costs.

For example, in the embodiment depicted in FIGS. 2A-2E, the inner vessel 1000 is made primarily from 304-grade stainless steel that has a nominal thickness of about 0.105 inches. The configuration of stiffeners 1100 shown in FIGS. 2A-2E and described above permits the inner vessel 1000 to have a maximum allowable tensile stress of 18,800 psi in compliance with ASME Section II, Part D, 1998 Edition, no addenda, as required by CSA B620, including the 4:1 safety factor, when inner vessel 1000 is part of a dewar transporting 6,000 gallons (or less) of liquid oxygen. Despite these qualities, inner vessel 1000 weighs no more than an equivalently sized (other than grade) dewar inner vessel made primarily from stainless steel that does not include the configuration of stiffeners 1100 shown and described in FIGS. 2A-2E and does not have a maximum allowable tensile stress of 18,800 psi in compliance with ASME Section II, Part D, 1998 Edition, no addenda, including the 4:1 safety factor, as required by CSA B620, and instead has only a maximum allowable tensile stress of 20,000 psi, with a safety factor of 3.5:1, pursuant to the current (as of the date of this application's filing) ASME Edition. Similarly, in the embodiment depicted in FIGS. 5A and 5B, the inner vessel 2000 is made primarily from 5083-grade aluminum that has a nominal thickness of about 0.175 inches. The configuration of stiffeners 2100 shown in FIGS. 5A and 5B and described above permits the inner vessel 2000 to have a maximum allowable tensile stress of 10,000 psi pursuant to ASME Section II, Part D, 1998 Edition, no addenda, as required by CSA B620, including the 4:1 safety factor, when inner vessel 2000 is part of a dewar transporting 8,200 gallons (or less) of liquid nitrogen or 5,000 gallons (or less) of liquid argon. Despite these qualities, inner vessel 2000 weighs no more than an equivalently sized (other than grade) dewar inner vessel made primarily from aluminum that does not include the configuration of stiffeners 2100 shown and described in FIGS. 5A and 5B and that does not have a maximum allowable tensile stress of 10,000 psi in compliance with ASME Section II, Part D, 1998 Edition, no addenda, including the 4:1 safety factor, as required by CSA B620, and instead has only a maximum allowable tensile stress of 11,400 psi, with a safety factor of 3.5:1, pursuant to the current (as of the date of this application's filing) ASME Edition.

Such stiffener configurations similarly permit an inner vessel of a dewar to resist the same amount stresses as an equivalently-sized inner vessel made from the same type of material but weigh less, so that the stiffener-configured dewar may transport greater amounts of cryogenic fluid per trip than the non-stiffener-configured dewar to reduce shipping costs. These "increased stress-resistance" inner vessel configurations (shown and described in FIGS. 2A-2E and 5A-5B) and "weight reduction" inner vessel configurations are possible because the configuration of stiffeners attached to the inner vessels (e.g., 1100 for the embodiment of FIGS. 2A-2E and 2100 for the embodiment of FIGS. 5A-5B) permit increased stress resistance while allowing the inner vessels to be of a thickness at least one gauge greater than that of equivalently sized dewar inner vessels made of the same material that do not include the stiffener configurations. It is contemplated herein that such stiffeners could be employed to accomplish both increased stress-resistance and weight reduction relative to an equivalently-sized dewar without such stiffeners.

Figure 6:
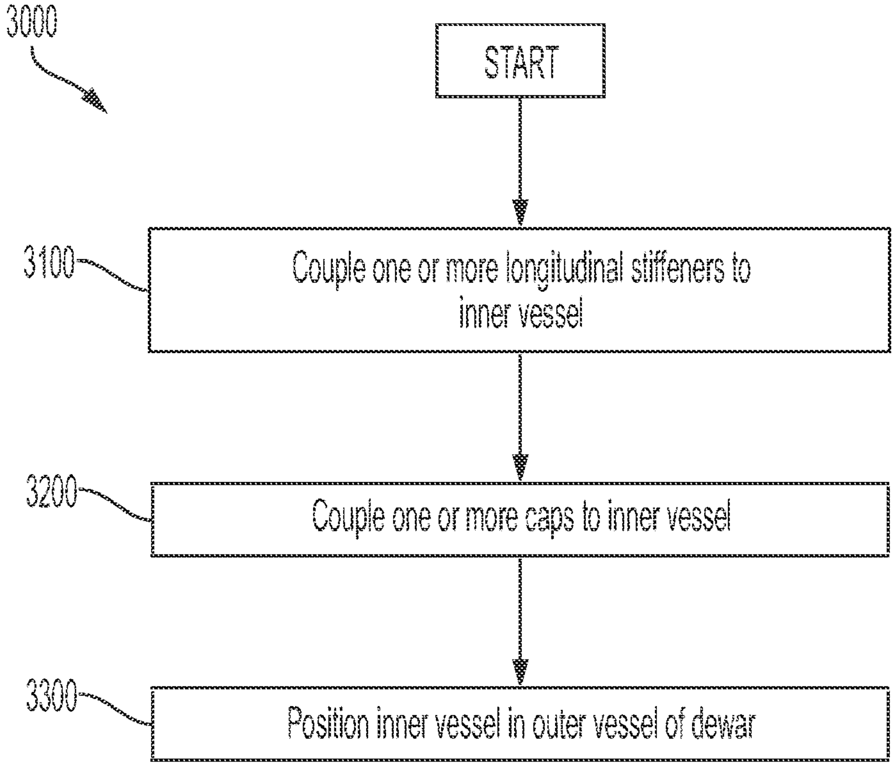
FIG. 6 is an example method for manufacturing an inner vessel of a cryogenic dewar having at least one longitudinal stiffener according to some embodiments of the disclosure.

A method 3000 for assembling a dewar having at least one longitudinal stiffener on its outer surface is shown in FIG. 6. The method 3000 may begin, at step 3100, with positioning and coupling via welding, fastening, or otherwise one or more longitudinal stiffeners to an outer surface of an inner vessel, for example, at the location(s) of the inner vessel that will experience the greatest tensile stress(es) during transport along a highway of cryogenic fluid within the inner vessel. For example, one or more stiffeners could be coupled in a row along the top center portion of the inner vessel. For example, additional stiffeners could be coupled in rows parallel and adjacent to that row. For example, one or more additional stiffeners could be coupled in a row along the bottom center portion and/or adjacent to the bottom center portion of the inner vessel at an opposite end of a line drawn from a corresponding longitudinal stiffener attached at the top and a center of the inner vessel. For example, the stiffeners could have different thicknesses and lengths and/or be made from different materials to provide optimal stress resistance while minimizing additional weight of the inner vessel.

At step 3200, the method 3000 may continue with positioning and coupling via welding, fastening, or otherwise one or more caps to one or more ends of the stiffener(s). For example, a cap may be coupled to the end of a stiffener such that a gap formed between the stiffener and the outer surface of the inner vessel is not accessible, including to debris or other materials.

At step 3000, the method 3000 may continue with positioning and securing the inner vessel having the longitudinal stiffener(s) and cap(s) within an outer vessel of a dewar. For example, the inner vessel may be secured to the outer vessel of the dewar such that the longitudinal stiffener(s) and cap(s) do not contact the outer vessel.

The schematic flow chart diagram of FIG. 6 is generally set forth as a logical flow chart diagram. Likewise, other operations for the circuitry are described without flow charts herein as sequences of ordered steps. The depicted order, labeled steps, and described operations are indicative of aspects of methods of the invention. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

The invention claimed is:

1. An apparatus comprising:

a dewar configured to store and transport cryogenic fluid across roadways, the dewar comprising:

an inner vessel having an outer surface;

an outer vessel having an inside surface; and a plurality of longitudinal stiffeners attached to a top portion of the inner vessel, each longitudinal stiffener of said plurality of longitudinal stiffeners avoiding direct and indirect contact with the outer vessel; and each longitudinal stiffener having a first end and a second end, and wherein each longitudinal stiffener makes continuous contact with said outer surface from the first end to the second end.

2. The apparatus of claim 1, wherein a first longitudinal stiffener of the plurality of longitudinal stiffeners has a different thickness than a second longitudinal stiffener of the plurality of longitudinal stiffeners in a radial direction relative to an axis of the inner vessel to resist different stresses of the inner vessel.

3. An apparatus, comprising:

a cryogenic dewar configured for transporting cryogenic liquids across roadways, the cryogenic dewar comprising:

an inner vessel;

an outer vessel; and a plurality of longitudinal stiffeners attached directly on an outside surface of the inner vessel of the cryogenic dewar;

said plurality of longitudinal stiffeners located between the outside surface of the inner vessel and an inside surface of the outer vessel such that said plurality of longitudinal stiffeners avoid direct and indirect contact with said inside surface of the outer vessel to avoid conductive heat transfer thereto; and wherein each longitudinal stiffener of said plurality of longitudinal stiffeners has a first end and a second end, and wherein each longitudinal stiffener makes continuous contact with the outer surface of the inner vessel from the first end to the second end.

4. The apparatus of claim 3, wherein the inner vessel comprises aluminum and a nominal thickness of about 0.175 inches.

5. The apparatus of claim 3, wherein the inner vessel comprises steel and has a nominal thickness of about 0.105 inches.

6. The apparatus of claim 3, wherein a first longitudinal stiffener of the plurality of longitudinal stiffeners is attached to a top portion of the outside of the inner vessel, and wherein a second longitudinal stiffener of the plurality of longitudinal stiffeners is attached to a bottom portion of the outside of the inner vessel of the cryogenic dewar.

7. The apparatus of claim 6, wherein the first longitudinal stiffener attached to the top portion is attached at a location opposite from the second longitudinal stiffener attached to the bottom portion.

8. The apparatus of claim 3, wherein the inner vessel comprises aluminum, wherein the cryogenic dewar is configured for use as part of a truck trailer and configured to transport about 8,200 gallons of liquid nitrogen, and wherein at least one longitudinal stiffener of said plurality of longitudinal stiffeners attached to the top portion of the outside of the inner vessel comprises an aluminum longitudinal stiffener having a nominal thickness of about 0.175 inches.

9. The apparatus of claim 3, wherein the inner vessel comprises aluminum, wherein the cryogenic dewar is configured for use as part of a truck trailer and configured to transport about 5,000 gallons of liquid argon, and wherein at least one longitudinal stiffener of said plurality of longitudinal stiffeners attached to the top portion of the outside of the inner vessel comprises an aluminum longitudinal stiffener having a nominal thickness of about 0.175 inches.

10. The apparatus of claim 9, wherein at least one longitudinal stiffener of said plurality of longitudinal stiffeners comprises 5083-grade aluminum.

11. The apparatus of claim 3, wherein the inner vessel comprises steel, wherein the cryogenic dewar is configured for use as part of a truck trailer and configured to transport about 6,000 gallons of liquid oxygen, and wherein at least one longitudinal stiffener of said plurality of longitudinal stiffeners attached to the top portion of the outside of the inner vessel comprises 304-grade stainless steel.

12. The apparatus of claim 11, wherein the at least one longitudinal stiffener attached to the top portion of the outside of the inner vessel comprises one or more longitudinal stiffeners having a nominal thickness of about 0.1054 inches, about 0.165 inches, or about 0.135 inches.

13. The apparatus of claim 3, wherein at least one longitudinal stiffener of said plurality of longitudinal stiffeners is attached to a top portion of the inner vessel, the at least one longitudinal stiffener attached to the top portion comprising a thickest stiffener at a location of highest stress.

14. The apparatus of claim 3, wherein the plurality of longitudinal stiffeners comprises a plurality of sets of longitudinal stiffeners, and wherein a first set of longitudinal stiffeners of the plurality of sets of longitudinal stiffeners is attached to a top portion of the outside of the inner vessel, and wherein a second set of longitudinal stiffeners of the plurality of sets of longitudinal stiffeners is attached to a bottom portion of the outside of the inner vessel; and wherein the first set of longitudinal stiffeners attached to the top portion comprises at least three stiffeners, wherein the second set of longitudinal stiffeners attached to the bottom portion comprises at least three stiffeners, wherein the first set of longitudinal stiffeners and the second set of longitudinal stiffeners are attached symmetrically around the outside of the inner vessel such that each of the at least three stiffeners of the first set of longitudinal stiffeners attached to the top portion is attached at a location opposite each of the at least three stiffeners of the corresponding second set of longitudinal stiffeners attached to the bottom portion.

15. The apparatus of claim 3, wherein at least one longitudinal stiffener of said plurality of longitudinal stiffeners is attached to a top portion of the inner vessel, the at least one longitudinal stiffener comprising a material that is welding compatible with the inner vessel.

16. The apparatus of claim 3, wherein the cryogenic dewar comprises 304-grade stainless steel and is configured to have a maximum allowable tensile stress of 18,800 pounds per square inch with a safety factor of four to one.

17. The apparatus of claim 3, wherein the cryogenic dewar comprises 5083-grade aluminum and is configured to have a maximum allowable tensile stress of 10,000 pounds per square inch with a safety factor of four to one.

18. The apparatus of claim 3, wherein said plurality of longitudinal stiffeners are located in a space between the outside surface of the inner vessel and the inside surface of the outer vessel, and wherein the inner vessel comprises a cavity for receiving cryogenic liquid, said cavity being isolated from said space and preventing fluid communication between said space and said cavity.

19. An apparatus comprising:

a dewar configured to store and transport across roadways cryogenic fluid, the dewar comprising:

an outer vessel having an inside surface; and an inner vessel having an outside surface, said inner vessel further comprising:

a plurality of longitudinal stiffeners attached directly to the outside surface of the inner vessel, wherein each longitudinal stiffener of the plurality of longitudinal stiffeners is located in a circumferentially continuous space between the outside surface of the inner vessel and the inside surface of the outer vessel, such that each longitudinal stiffener of the plurality of longitudinal stiffeners avoids both direct and indirect contact with the outer vessel; and wherein each longitudinal stiffener has a first end and a second end, and wherein each longitudinal stiffener makes continuous contact with the outside surface of the inner vessel from the first end to the second end; and wherein a first longitudinal stiffener of the plurality of longitudinal stiffeners has a different thickness than a second longitudinal stiffener of the plurality of longitudinal stiffeners in a radial direction relative to an axis of the inner vessel to resist different stresses of the inner vessel.

20. The apparatus of claim 19, wherein the dewar comprises 304-grade stainless steel and is configured to have a maximum allowable tensile stress of 18,800 pounds per square inch with a safety factor of four to one.

* * * * *